United States Patent
Burris et al.

(10) Patent No.: US 10,429,249 B2
(45) Date of Patent: Oct. 1, 2019

(54) THERMOCOUPLE TRANSITION BODY APPARATUS

(71) Applicant: Cleveland Electric Laboratories, Tempe, AZ (US)

(72) Inventors: Sean Burris, Tempe, AZ (US); Michael McNeilly, Gilbert, AZ (US)

(73) Assignee: Cleveland Electric Laboratories, Tempe, AZ (US)

( * ) Notice: Subject to any disclaimer, the term of this patent is extended or adjusted under 35 U.S.C. 154(b) by 154 days.

(21) Appl. No.: 15/593,967

(22) Filed: May 12, 2017

(65) Prior Publication Data

US 2017/0328785 A1 Nov. 16, 2017

Related U.S. Application Data

(60) Provisional application No. 62/335,153, filed on May 12, 2016.

(51) Int. Cl.
| | |
|---|---|
| *G01K 7/02* | (2006.01) |
| *H01R 4/30* | (2006.01) |
| *H01R 4/48* | (2006.01) |
| *H01R 4/34* | (2006.01) |
| *H01R 4/70* | (2006.01) |

(52) U.S. Cl.
CPC ............ *G01K 7/023* (2013.01); *H01R 4/30* (2013.01); *H01R 4/34* (2013.01); *H01R 4/48* (2013.01); *H01R 4/70* (2013.01); *H01R 2201/20* (2013.01)

(58) Field of Classification Search
CPC . G01K 7/023; G01K 7/02; G01K 7/06; H01R 4/70; H01R 2201/20; H01R 4/34; H01R 4/48; H01R 4/30
See application file for complete search history.

(56) References Cited

U.S. PATENT DOCUMENTS

| | | | | |
|---|---|---|---|---|
| 2,410,098 | A * | 10/1946 | Muller | G01K 7/023 136/235 |
| 3,725,847 | A * | 4/1973 | Guneratne | G01K 7/023 374/E7.005 |
| 4,450,315 | A * | 5/1984 | Waterman | G01K 1/08 136/230 |
| 4,460,225 | A * | 7/1984 | Moore | H01R 13/22 374/E7.005 |
| 4,590,329 | A * | 5/1986 | Potochnik | H01R 13/59 174/76 |
| 5,167,519 | A * | 12/1992 | Jones | G01K 7/023 136/235 |
| 6,102,565 | A * | 8/2000 | Kita | G01K 7/02 136/233 |
| 6,267,626 | B1 * | 7/2001 | Hollander | G01K 7/023 374/E7.005 |

(Continued)

*Primary Examiner* — Lisa M Caputo
*Assistant Examiner* — Philip L Cotey
(74) *Attorney, Agent, or Firm* — Emerson Thomson & Bennett, LLC; Roger D. Emerson

(57) ABSTRACT

Provided is a thermocouple transition body apparatus comprising: a transition body, having at least one recess; a positive electrical terminal; a negative electrical terminal; and, at least one cap; wherein the transition body, positive terminal, and negative terminal are configured to attach to conductors without the use of epoxy or crimping. The thermocouple transition body apparatus is able to withstand temperatures exceeding 500 degrees Fahrenheit.

2 Claims, 3 Drawing Sheets

(56) References Cited

U.S. PATENT DOCUMENTS

| | | | | |
|---|---|---|---|---|
| 7,665,890 B2* | 2/2010 | Culbertson | ............ | G01K 7/023 |
| | | | | 374/100 |
| 2004/0114664 A1* | 6/2004 | Park | ........................ | G01K 1/12 |
| | | | | 374/179 |
| 2005/0112945 A1* | 5/2005 | Park | ....................... | G01K 7/023 |
| | | | | 439/620.21 |
| 2007/0161297 A1* | 7/2007 | Tymkewicz | ............ | G01K 7/023 |
| | | | | 439/695 |
| 2008/0025372 A1* | 1/2008 | Culbertson | .............. | G01K 1/08 |
| | | | | 374/185 |
| 2010/0048065 A1* | 2/2010 | MacKinnon | ............ | G01K 7/023 |
| | | | | 439/695 |
| 2013/0070808 A1* | 3/2013 | Daily | ..................... | G01K 1/026 |
| | | | | 374/179 |
| 2013/0243036 A1* | 9/2013 | Scervini | .................. | H01L 35/20 |
| | | | | 374/179 |
| 2016/0169749 A1* | 6/2016 | Glasheen | ................. | G01K 1/08 |
| | | | | 374/179 |
| 2016/0290872 A1* | 10/2016 | Ihle | .......................... | G01K 7/22 |

\* cited by examiner

THERMOCOUPLE TRANSITION BODY APPARATUS

TECHNICAL FIELD

The present invention relates to electrical conductors. More particularly, the present invention relates to a thermocouple transition body apparatus for use in measuring temperature differentials across an electrical circuit.

BACKGROUND

Thermocouples are commonly used in the aerospace industry to instrument and measure temperatures in critical components of engines, turbines or other high-performance machines. A thermocouple consists of two dissimilar metal conductors that are electrically bonded to form a junction at the point where temperature measurement is to take place; when the temperature at the junction differs from the temperature at a different reference location in the circuit, a voltage having a known relationship to the temperature and the thermocouple metals used develops across the two conductors. Thermocouples are very simple and reliable, but ordinary electrical insulation on their conductors would quickly be destroyed by the high temperatures encountered in the hot sections of some engines or turbines. Thermocouples for such applications therefore are manufactured using an outer sheath or tube made of an alloy that has a very high melting temperature and is hollow, within which the conductors are insulated with nonconductive magnesium oxide powder which does not melt at the temperatures involved. The thermocouple junction is located just inside the tip of the sheath, which commonly is closed at the end to protect it. This configuration is referred to herein as a "hard line" thermocouple; some can tolerate temperatures of several thousand degrees.

Developmental testing of new engine or high-performance machinery designs may require instrumentation with dozens or hundreds of thermocouples located in carefully chosen locations. The hard lines are stiff and are formed, routed and mounted in place along selected paths on the engine or machine under test. The data collection equipment to which the thermocouples connect is located external to the enclosure or cell in which the engine or machine is operated, but the hard lines will not tolerate repeated flexing, so after exiting the hot section(s) and reaching locations where temperatures are sufficiently benign to allow use of more conventional electrical insulation, the hard line thermocouple conductors are transitioned to flexible extension leads which then egress to the data collection equipment located near the engine or machine test cell. The current method of making this transition typically involves manual crimping of a strain relief device between the flexible extension leads and the hard line sheath, soldering of the extension lead wires to the wires exiting the hard line sheath, insulating the soldered connections using epoxy, and manual crimping of an additional outer protective sleeve over the inner strain relief device and insulated connections. Due to the custom nature of the testing that requires such instrumentation, the manual crimping process typically is performed on site in the engine or machine test cell. The wires exiting the hard line sheath are very fine gauge (as small as 0.006 inch diameter), and the soldering, insulating, epoxy cure times, and manual crimping processes add up to a difficult and time-consuming process that requires skill, careful technique and attention to delicate details. Despite careful technique, shorting of spliced leads or breakage of a fine lead where it exits the hard line sheath still sometimes occurs, rendering that particular thermocouple useless. If temperature measurements from that particular thermocouple are critical, then (depending on its location) replacement of the thermocouple may require either partial or total disassembly of the engine or machine—an expensive loss in terms of both time and money. Even if no wire breakage or shorting occurs, the process of carefully soldering, insulating and crimping the many leads and sleeves is tedious, non-ergonomic, and causes manual fatigue. If the extension leads must be changed, the leads must be cut and the new leads rejoined, reinsulated and re-crimped, with attendant increased risk of a short or breakage.

What is needed is a device that provides a means of rapidly, easily and reliably transitioning hard line thermocouple conductors to flexible extension leads without requiring manual soldering, insulating and crimping.

SUMMARY

Provided is a thermocouple transition body apparatus comprising: a transition body, having at least one recess; a positive electrical terminal; a negative electrical terminal; and, at least one cap; wherein the transition body, positive terminal, and negative terminal are configured to attach to conductors without the use of epoxy or crimping. The thermocouple transition body apparatus is able to withstand temperatures exceeding 500 degrees Fahrenheit.

DETAILED DESCRIPTION

As discussed herein, the thermocouple transition body apparatus may be alternatively referred to as a thermocouple or thermocouple apparatus with no change in meaning thereof.

Figure 1:
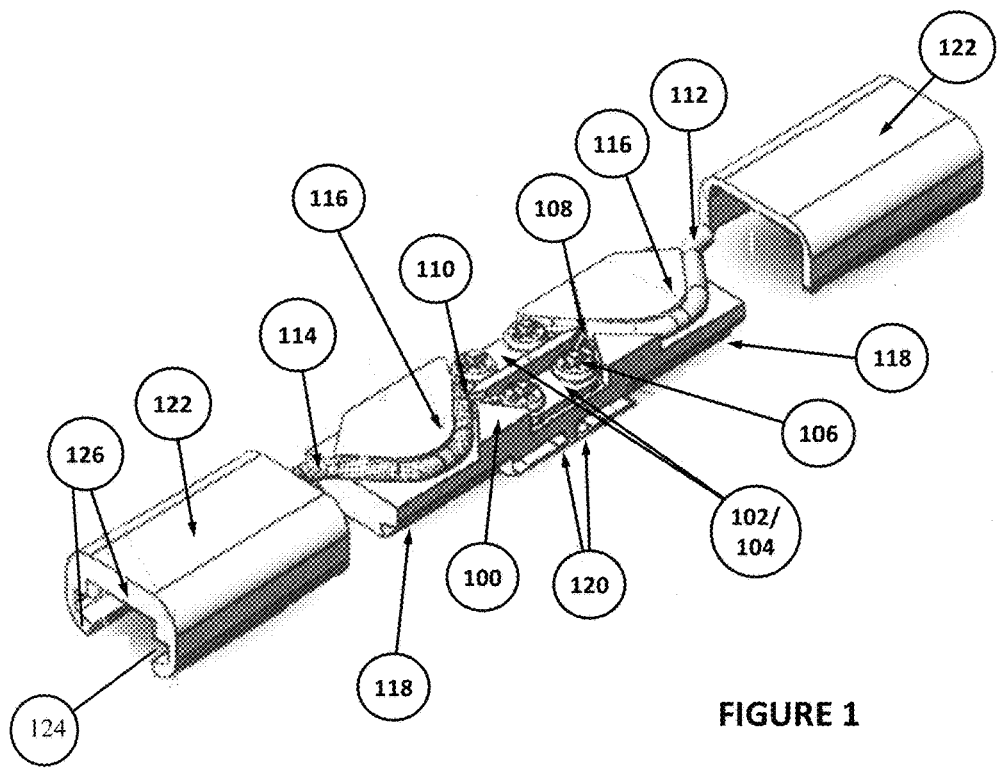
FIG. 1 is a perspective view of an embodiment of a thermocouple transition body apparatus with electrical wiring installed.
Figure 2:
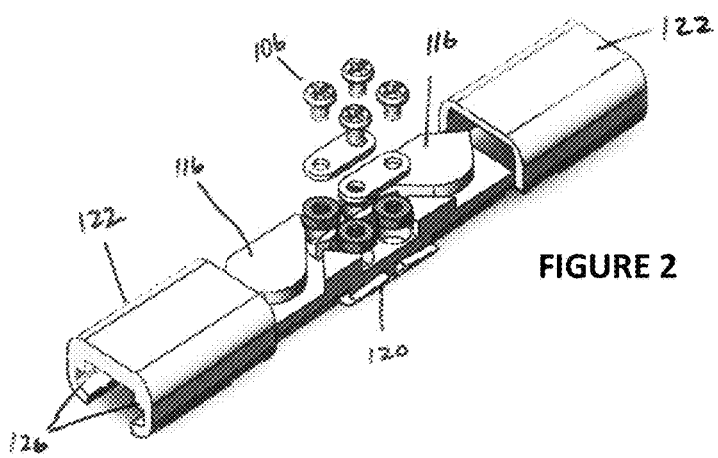
FIG. 2 is an exploded perspective view of an embodiment of a thermocouple transition body apparatus.

With reference to FIGS. 1 and 2, the transition body 100 is generally rectangular in shape, and may be made of a composite material that is nonconductive, physically robust, and tolerant of both high and low temperatures without degradation of its electrical and physical properties. The transition body 100 should be able to operate normally without degradation at all temperatures, including below the freezing point of water or exceeding 500 degrees Fahrenheit.

With continued reference to FIGS. 1 and 2, a positive terminal 102 and a negative terminal 104, can be molded into the top flat face of the transition body 100, each metal terminal having two female threads to accept similarly-threaded screws 106. The positive and negative terminals 102/104 and corresponding screws 106 constitute a means of electrically and mechanically connecting the thermocouple conductors 108 to the extension wire conductors 110, thus continuing the electrical path between the two leads. The positive and negative terminals 102/104 and corresponding screws 106 can made of alloys chosen to be compatible with the metal alloys used for the thermocouple conductors 108 and extension wire conductors 110. For example, for a type K thermocouple the positive and negative terminals 102/104 can be made of Chromel and Alumel respectively.

Figure 3:
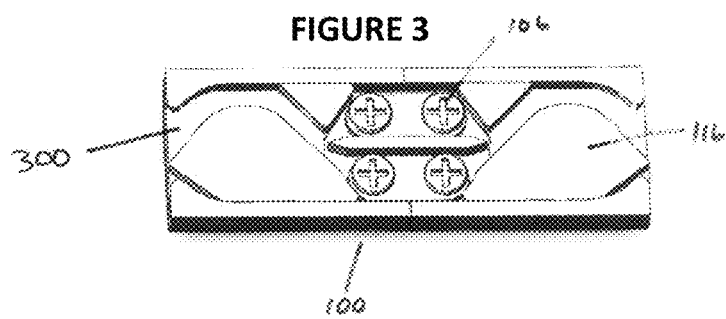
FIG. 3 is close-up view of the terminal region of the thermocouple transition body apparatus embodiment.

With continued reference to FIGS. 1 and 2, the transition body 100 can have physical recesses (best seen in FIG. 3, reference 300) that can be curved and configured to accommodate and closely fit both the hard line sheath 112 and flexible extension wires 114. The recesses 300 can be defined by raised areas 116 on either side of the recesses which can be molded into the face of the transition body 100. The raised areas 116 can provide strain relief for the hard line sheath 112 and flexible extension wires 114.

With continued reference to FIGS. 1 and 2, tracks 118 and female snap locks 120 can be molded into the sides of the transition body 100, these features being profiled to fit and accept correspondingly-profiled protective caps 122 which can be installed onto the transition body 100 by sliding the protective caps 122 onto the transition body 100 at either or both ends. The protective caps 122 may similarly be made of a composite material that is nonconductive, physically robust, and tolerant of both the same high and low temperatures as the transition body 100, without degradation of electrical and physical properties. The protective caps 122 can be molded with profiles on their sides that act as slides 124 which interface with and fit the tracks 118 molded into the sides of the transition body 100. Portions of the side profiles of the top caps 122 can be configured to form lead-in ramps that allow less initial force to be applied to the protective caps 122 as their first portions are slid onto the transition body 100. The faces of the protective caps 122 can vary in the thickness of the material, being thinner at their ends closest to the center of the transition body 100 and increasing in thickness toward their opposite ends such that, as the protective caps 122 are installed by sliding them from both ends toward the center of the transition body 100, the clearance between the undersides of the protective caps 122 and the top flat face of the transition body 100 can decrease, thereby functioning as a wedge 126 that can press down on and can linearly and rotationally immobilize the hard line sheath 112 and flexible extension wires 114 which previously have been routed through the recesses 300 molded into the face of the transition body 100. The wedge 126 can provide additional strain relief on the hard line sheath 112 and flexible extension wires 114.

Figure 4:
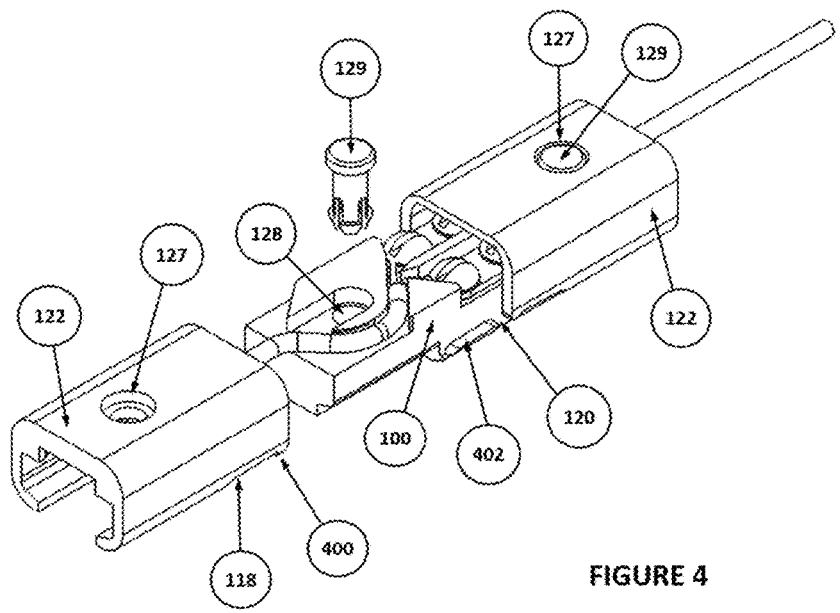
FIG. 4 is an exploded side view of an embodiment of a thermocouple transition body apparatus, showing use of inserted locking pins.
Figure 5:
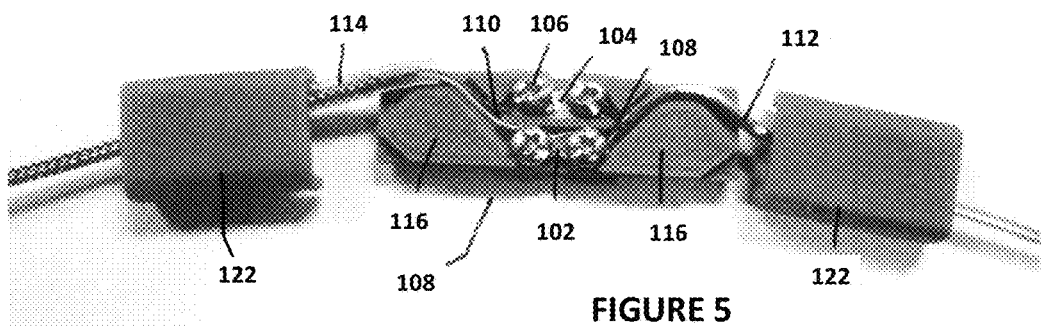
FIG. 5 is an overhead view of an embodiment of a thermocouple transition body apparatus with electrical wiring installed.

With reference to FIG. 4, small male snap teeth 400 can be molded into the side tracks 118 of the protective caps 122 in locations such that, as the protective caps 122 are installed on the transition body 100, these features can engage with small ramps 402 and female snap locks 120 which can be molded into the sides of the transition body 100 near its center. When the protective caps 122 are fully installed, the male snap teeth 400 and female snap locks 120 lock together, thereby providing means of securing the protective caps 122 in place when they are slid into proper position. As an alternative to snap locks (400 and 120 collectively), a hole 127 can pass through each protective cap 122, located so as to align with a corresponding hole 128 in the transition body 100 when the protective cap 122 is fully installed. A locking pin 129 may be inserted into each of the aligned holes 127 in the protective caps 122 and holes 128 in the transition body 100, thereby providing means of securing the protective caps 122 in place after they are slid into the proper position. With the protective caps 122 fully installed and the snap locks (400 and 120 collectively) engaged, or alternatively with the locking pins 129 inserted, the protective caps 122 can protect the spliced connections of the thermocouple conductors 108 to the extension wire conductors 110 and also provide a locking means of strain relief that ensures that the hard line sheath 112 and flexible extension wires 114 are adequately restrained. With application of appropriate force in the proper location, or alternatively with removal of locking pins 129, the protective caps 112 can be unlocked and slid back open to release the strain relief and reveal the positive and negative terminals 102/104. According to another aspect of the invention, the transition body 100 can include both snap locks (400 and 120 collectively) and locking pins 129 to further secure the protective caps 122 in the closed position.

Figure 6:
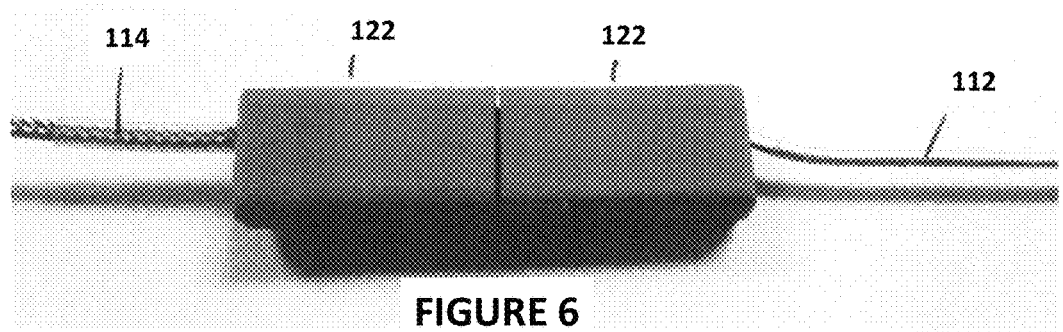
FIG. 6 is an overhead view of an embodiment of a closed thermocouple transition body apparatus with electrical wiring installed.
Figure 7:
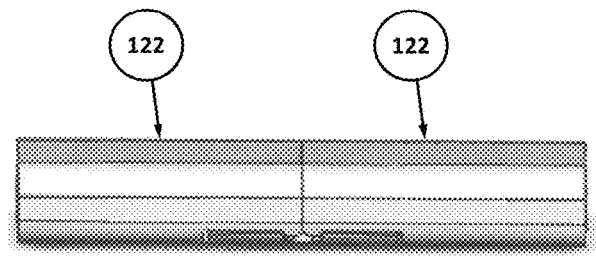
FIG. 7 is a side view of an embodiment of a closed thermocouple transition body apparatus; and, FIG. 8 is a side view of an embodiment of a closed thermocouple transition body apparatus with electrical wiring installed.
Figure 8:
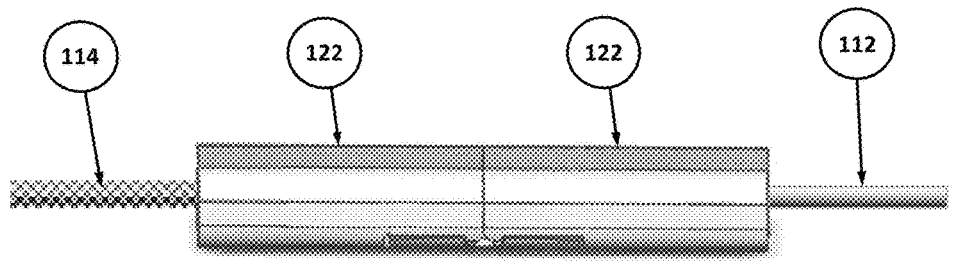

With reference to FIGS. 5-8, the disclosed thermocouple apparatus is shown from various angles with the protective caps 122 in the open (FIG. 5) and closed position (FIGS. 6-8). When the protective caps 122 are closed, the hard line sheath 112 and flexible extension wires 114 can be locked into the thermocouple apparatus and extend therefrom. The protective caps 122 can provide strain relief to the hard line sheath 112 and the flexible extension wires 144. Additionally, the closed protective caps 122 can provide physical isolation and electrical insulation of the thermocouple conductors 108 and the extension wire conductors 110 without the need to apply insulating epoxy. In turn, this can eliminate the time delay in waiting for epoxy to cure, and can eliminate the need to manually "dress" and tuck epoxy-insulated soldered splices into a volume small enough to fit within an outer crimped protective sleeve, thus greatly improving the consistency and integrity of the necessary electrical isolation for such connections.

According to the disclosed embodiments, the protective caps 122 and transition body 100 can eliminate the need to make multiple connections, thereby reducing the risk of wire breakage or shorting. Further, the disclosed apparatus can be opened and the lead wires can be changes, thereby allowing the apparatus to be reusable for multiple applications. Finally, the disclosed apparatus can facilitate changing of extension leads if necessary during an instrumentation reconfiguration without requiring cutting and re-soldering, reinsulating and re-crimping.

According to the described embodiments, the positive terminal 102 and negative terminal 104 are arranged side by side, however, according to other embodiments the positive and negative terminals 102/104 can be arranged diagonally or in tandem relation to each other.

According to another embodiment, the disclosed apparatus, including the transition body 100 and protective caps 122, may be resized or reshaped according to the desired application without removing or altering the function as disclosed herein.

As described above, the present disclosure has been described with preferred embodiments thereof and it is understood that many changes and modifications to the described embodiments can be carried out without departing from the scope and the spirit of the present disclosure that is intended to be limited only by the appended claims.

We claim:

1. A thermocouple transition body apparatus comprising:
   a transition body, having at least one recess, a thermocouple conductor, and an extension wire conductor; wherein the transition body is formed of a non-conductive composite material;
   a positive electrical terminal having at least one female thread for receiving a first screw;
   a negative electrical terminal having at least one female thread for receiving a second screw; and,
   at least one cap; wherein the at least one cap is formed of a non-conductive composite material;
   wherein the positive and negative electrical terminals and corresponding first and second screws provide an electrical and mechanical connection from the thermocouple conductor to the extension wire conductors, and;
   wherein the connection provided by the positive and negative electrical terminals from the thermocouple conductor to the extension wire conductor are configured without the use of epoxy or crimping;
   wherein the transition body, positive electrical terminal, negative electrical terminal, and at least one cap are configured to attach to a hard line sheath and flexible extension wires;
   wherein the positive electrical terminal and negative electrical terminal further comprise an alloy material, the positive electrical terminal has a first and second female thread for receiving corresponding screws, and the negative electrical terminal has a first and second female thread for receiving corresponding screws;
   wherein the transition body further comprises:
      tracks; and either:
         female snap locks; or
         at least one transition body hole operable to accept at least one locking pin; and,
   wherein the at least one cap further comprises:
      slides; wherein the slides correspond to the tracks on the transition body; and either:
         male snap teeth; wherein the male snap teeth are operable to interlock with the female snap locks on the transition body thereby locking the at least one cap in a closed position; or
         a cap hole operable to accept the at least one locking pin; wherein the position of the cap hole aligns with the at least one transition body hole when the at least one cap is in a closed position, wherein the alignment of the holes allows insertion of the at least one locking pin through both holes thereby locking the at least one cap in the closed position.

2. The thermocouple transition body apparatus of claim 1 wherein the apparatus is capable of withstanding temperatures exceeding 500 degrees Fahrenheit.

* * * * *